(12) United States Patent
Tiwari

(10) Patent No.: US 7,043,255 B1
(45) Date of Patent: May 9, 2006

(54) DYNAMIC SERVER MANAGED PROFILES FOR MOBILE USERS

(75) Inventor: Anil Tiwari, Palo Alto, CA (US)

(73) Assignee: At Road, Inc., Fremont, CA (US)

( * ) Notice: Subject to any disclaimer, the term of this patent is extended or adjusted under 35 U.S.C. 154(b) by 455 days.

(21) Appl. No.: 10/377,575

(22) Filed: Feb. 28, 2003

(51) Int. Cl.
*H04Q 7/20* (2006.01)

(52) U.S. Cl. .................................. 455/456.1; 702/206

(58) Field of Classification Search ............. 455/456.3, 455/456.1; 702/204, 206, 207
See application file for complete search history.

(56) References Cited

U.S. PATENT DOCUMENTS

| | | | |
|---|---|---|---|
| 5,959,577 A * | 9/1999 | Fan et al. ............... | 342/357.13 |
| 6,362,730 B1 | 3/2002 | Razavi et al. | |
| 6,408,196 B1 | 6/2002 | Sheynblat et al. | |
| 6,697,842 B1 * | 2/2004 | Smith et al. ................ | 709/206 |
| 2002/0002599 A1 | 1/2002 | Arner et al. | |
| 2002/0013815 A1 | 1/2002 | Obradovich et al. | |
| 2002/0033225 A1 | 3/2002 | Becker et al. | |
| 2002/0042266 A1 | 4/2002 | Heyward | |
| 2002/0065698 A1 | 5/2002 | Schick et al. | |
| 2002/0124065 A1 | 9/2002 | Barritt et al. | |
| 2002/0184200 A1 | 12/2002 | Ueda et al. | |

FOREIGN PATENT DOCUMENTS

| | | |
|---|---|---|
| WO | PCT/US00/27749 | 4/2001 |
| WO | WO 01/26288 A1 | 4/2001 |
| WO | PCT/US01/19532 | 12/2001 |
| WO | WO 01/96906 A1 | 12/2001 |
| WO | PCT/US01/22686 | 2/2002 |
| WO | WO 02/10939 A1 | 2/2002 |

* cited by examiner

*Primary Examiner*—Creighton Smith
(74) *Attorney, Agent, or Firm*—MacPherson Kwok Chen & Heid LLP; Greg J. Michelson

(57) ABSTRACT

Systems and methods are disclosed to provide mobile resource management. In accordance with one embodiment, mobile communication devices, which employ location determination techniques, communicate with a server via one or more wired or wireless networks. The server provides a profile to the mobile communication devices, with the profile containing parameters which control certain operations of the mobile communication devices. The mobile communication devices provide location information to the server and communicate with the server to enable reporting, dispatching, messaging, and/or management services.

26 Claims, 1 Drawing Sheet

DYNAMIC SERVER MANAGED PROFILES FOR MOBILE USERS

TECHNICAL FIELD

The present invention relates generally to communication systems and, more particularly, to systems and methods for managing mobile resources.

BACKGROUND

Mobile communication devices are well known and are utilized by individuals and businesses to communicate various types of information. Mobile communication devices may include, for example, wireless telephones, personal digital assistants (PDAs), and other types of communication devices that can communicate (e.g., text and/or voice) over a wireless communication link. These mobile communication devices may also include location determination techniques, such as for example via their cellular network or by utilizing satellite signals (e.g., global positioning system (GPS) satellites).

Various services have evolved to assist in managing the operation of the mobile communication devices. For example, a vehicle locating service may receive various information from a mobile communication device, including position, velocity, time, and possibly a message. The vehicle locating service may then provide this information on a map, which may also include the location of other associated mobile communication devices. As an example, a business may find this information useful to quickly determine the location of their vehicles that are carrying the mobile communication devices.

A drawback of conventional vehicle locating services is that typically each mobile communication device must be configured by its user with respect to various configurable operational parameters. This makes it very difficult for a business, for example, to view or manage these parameters and standardize them at a company level for all of their mobile communication devices. For example, to update or change these parameters, each user must be individually notified to make the necessary change to the operational parameters of their associated device. Consequently, a user may fail to receive the notice or may fail to correctly make the necessary change. As a result, there is a need for improved systems and methods for managing mobile resources.

SUMMARY

Systems and methods are disclosed herein to provide mobile resource management. For example, in accordance with one embodiment of the present invention, profiles for associated mobile communication devices are stored at a central location (e.g., on a server). The profiles can be downloaded or electronically transferred to the mobile communication devices, which then adjust their operation based on parameters defined by the profiles. In accordance with one embodiment, the profiles can only be changed at the central location, which may result in reduced costs and errors and greater efficiency in managing the mobile resources.

More specifically, in accordance with one embodiment of the present invention, a system includes a network; a data processor coupled to the network; and at least one mobile communication device adapted to couple to the network to communicate with the data processor and adapted to receive location information, wherein the data processor provides a profile to the at least one mobile communication device, the profile containing parameters which control certain operations of the at least one mobile communication device.

In accordance with another embodiment of the present invention, a method of managing mobile communication devices includes creating a profile that defines certain operational parameters of the mobile communication devices; storing the profile on a data processing system; and transferring the profile from the data processing system to the mobile communication devices, wherein the mobile communication devices operate based on the operational parameters of the profile.

In accordance with another embodiment of the present invention, a mobile communication device includes a location determination system adapted to receive signals transmitted from satellites or a cellular network to determine a location of the mobile communication device; and a communication system adapted to transmit and receive information through a wireless network, wherein the communication system is further adapted to communicate with a data processing station to receive a profile containing parameters which control certain functions of the mobile communication device.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The preferred embodiments of the present invention and their advantages are best understood by referring to the detailed description that follows. It should be appreciated that like reference numerals are used to identify like elements illustrated in one or more of the figures.

DETAILED DESCRIPTION

Figure 1:
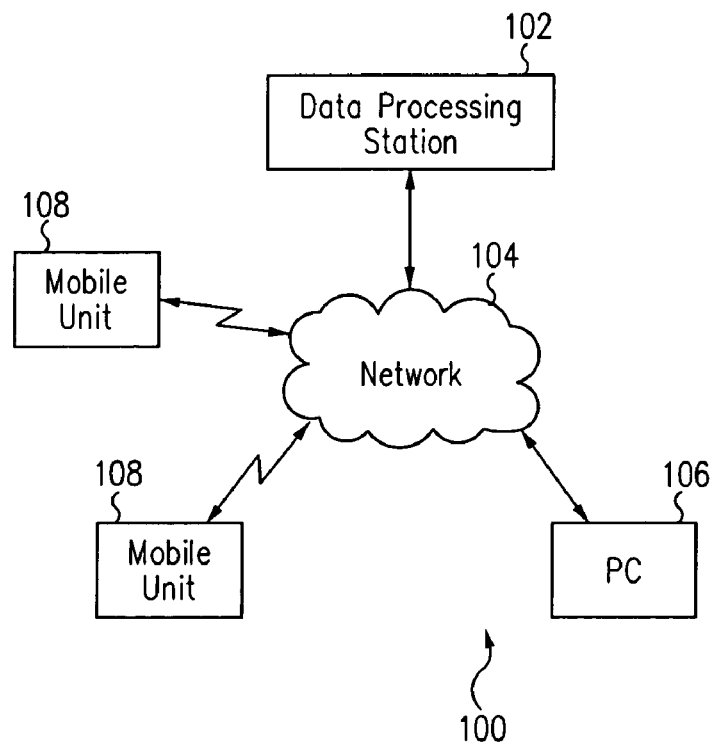
FIG. 1 shows a block diagram illustrating a system in accordance with an embodiment of the present invention.

FIG. 1 shows a block diagram illustrating a system 100 in accordance with an embodiment of the present invention. System 100 includes a data processing station 102, a network 104, a computer 106, and mobile units 108. Data processing station 102 (e.g., servers or other types of computers for managing data) stores one or more profiles for mobile units 108. As explained in further detail herein, the profile is a list of configurable parameters that define one or more operational parameters of mobile unit 108.

Data processing station 102 is coupled or connected via a wireless or wired connection to network 104 (e.g., a local or wide area data network, the Internet, or a wireless network) to enable communication with computer 106 and mobile units 108. As shown, computer 106 can also be connected to network 104 via a wired or wireless connection. Computer 106 may represent a personal computer (PC) or other type of computer, such as for example any type of telephone or PDA that is capable of communication via network 104 and able to display text and/or graphical information. Computer 106 is employed to manage (e.g., create, view, or edit) the profile (stored on data processing station 102) for one or more of mobile units 108.

Mobile unit 108 may represent any type of mobile communication device, such as for example a wireless telephone (e.g., a cell phone or a satellite phone) or a PDA. Mobile unit 108 is typically coupled to network 104 via a wireless connection, such as for example through a cellular network or other type of wireless network capable of ultimately providing access to network 104 (e.g., via a wireless service access connection). Alternatively, if network 104 is a wireless network, mobile unit 108 may communicate directly with network 104 via a wireless connection.

Mobile unit 108 also employs a location determination method that provides position and possibly velocity and time information for mobile unit 108. The location determination method may be performed by mobile unit 108 or a device may be couplable to mobile unit 108 to provide the location and other related information. For example, mobile unit 108 may incorporate a GPS receiver or be couplable to a GPS receiver to perform location determination. Alternatively, the location determination method may be performed using techniques other than GPS, such as for example known location determination techniques achieved via a cellular or other type of wireless network. The location determination method utilized may include providing partial position information (e.g., pseudoranges in a GPS system), which is transmitted to data processing station 102 for further location determination.

As illustrated in FIG. 1, system 100 allows mobile resource management to be performed centrally at data processing station 102. As an example, data processing station 102 stores a server based profile for each mobile unit 108, which can be downloaded or otherwise electronically transferred to mobile unit 108. Mobile unit 108 utilizes the parameters contained in the profile to define its operational parameters (i.e., mobile unit 108 operates at least partially as defined by the profile parameters).

In accordance with one embodiment, the profile parameters for mobile unit 108 can only be set via data processing station 102, which may substantially reduce the cost of managing mobile units 108. For example, computer 106 may be utilized to create or view and change the profile parameters (stored on data processing station 102) for one or more of associated mobile units 108. The updated profile is then downloaded to the associated mobile units 108 or certain ones of the associated mobile units 108. Each mobile unit 108 may allow a user to only view and not edit the profile parameters loaded into mobile unit 108. Consequently, the cost of updating the profiles for mobile units 108 may be substantially reduced for a business managing a number of mobile units 108. Furthermore, the number of inconsistencies or errors in the profiles of mobile units 108 may be greatly reduced or eliminated.

It should be noted that FIG. 1 illustrates computer 106 and a number of mobile units 108, but this is representative only and in general system 100 may include a number of computers 106 and a number of mobile units 108, with certain ones of computers 106 associated with certain ones of mobile units 108. Thus, system 100 may be utilized to provide location-relevant and time-sensitive information services to businesses and organizations managing mobile resources.

In accordance with one embodiment, system 100 may combine GPS technology, wireless communications, and the Internet to enable companies to efficiently manage the movement of mobile units 108 carried by personnel or vehicles and provide location, reporting, dispatching, messaging, and management services. For example, computer 106 may employ a web browser to access a website provided by data processing station 102 to create or modify profiles for one or more of the mobile units 108, to track the movement of their vehicles, employees, and goods and services, to provide detailed information for managing mobile resources, and to enable two-way messaging between computer 106 and associated mobile units 108. Further exemplary details regarding monitoring of mobile units may be found, for example, in U.S. Pat. No. 5,959,577, which is incorporated herein by reference in its entirety.

As an example of operation in accordance with an embodiment of the present invention, one of computers 106 may belong to a trucking company that desires to monitor a number of their mobile units 108 that are distributed among their trucks or carried by their truck drivers. Mobile units 108 periodically determine their position, velocity, and time by utilizing GPS. This information is provided at set intervals to data processing station 102. If a truck driver sends a text message to data processing station 102, mobile unit 108 will also determine and include the position, velocity, and time information with the text message. The trucking company utilizes its computer 106 to log into the website of data processing station 102 and view the location of their mobile units 108 on a zoomable street map. Any text messages that have been sent by mobile units 108 can be read and a reply text message may be sent. Furthermore, one or more text messages can be sent to one or more of mobile units 108.

The profile or list of configurable operational parameters may be employed to control, for example, the types of information that is collected from mobile units 108 and how often. For example, one or more parameters may control how often information such as location, speed, direction of travel, and stops are collected. Detailed reports providing activity details or summaries may be generated for mobile units 108, which can be stored on data processing station 102 or sent to computer 106 via email or a file transfer protocol site.

As an example, Table 1 illustrates an exemplary list of profile parameters. The entire list may form a profile or various parameters from the list may be selected to form a profile that is then transferred to one or more of mobile units 108. Therefore, profiles may be created to suit the needs of the intended or expected behavior of mobile units 108 (e.g., mobile units 108 associated with concrete mixers, slow-moving construction vehicles, rental cars, taxis, delivery trucks, salespersons, executives, police or fire personnel, etc.).

For example, parameter ID 0 in Table 1 is used to set a speed threshold (e.g., 5 km/hr) for determining if mobile unit 108 is moving or stopped. Parameter ID 1 is used to set a time threshold (e.g., 3 minutes) for determining when mobile unit 108 has stopped for a period of time rather than momentarily stopped. Parameter IDs 2–6 are stop timer settings for triggering an event or notification to be sent from mobile unit 108 to data processing station 102 when mobile unit 108 has been stopped for the time specified by the specific parameter.

Parameter ID 7 is used to set how often position, velocity, and time (PVT) information is collected by mobile unit 108 (e.g., having a GPS receiver). Parameter ID 8 is used to set how often the PVT and/or other information are logged (i.e., recorded) in order to be available for transmission by mobile unit 108 to the server. Parameter ID 10 is used to set how often information from mobile unit 108 is sent to data processing station 102.

As an example, mobile unit 108 may be a GPS enabled cell phone that obtains a GPS fix at certain time intervals (set by parameter ID 7). Each GPS fix may be recorded for transmission to the server or only certain GPS fixes (e.g., every other GPS fix or at certain time intervals) may be recorded (set by parameter ID 8). All of the information recorded since the last transmission may be sent or certain information from the recorded log since the last transmission (along with other information which may or may not be in the log, such as text or canned messages as described below) may be sent at specified intervals (set by parameter ID 10).

Parameter IDs 20–22 are used to power down various components (e.g., transmitter or modem, GPS receiver, or all of mobile unit 108, respectively) of mobile unit 108 depending on the length of time that it is stationary (i.e., not moving). The remaining parameter IDs are self explanatory from the description in Table 1.

TABLE 1

Exemplary Profile Parameters

| Parameter ID | Description | Units/Range |
|---|---|---|
| 0 | Move to Stop Speed Threshold | 0–255 km/hr |
| 1 | Brief Stop to Stop time-out | 10 second units |
| 2 | Stop Timer-1 Setting | 10 second units<br>0 = timer disabled |
| 3 | Stop Timer-2 Setting | 10 second units<br>0 = timer disabled |
| 4 | Stop Timer-3 Setting | 10 second units<br>0 = timer disabled |
| 5 | Stop Timer-4 Setting | 10 second units<br>0 = timer disabled |
| 6 | Stop Timer-5 Setting (re-occurring) | 10 second units<br>0 = timer disabled |
| 7 | GPS Sample Rate | Seconds |
| 8 | PVT (position velocity time) Log rate in MOVE state | If > 0;<br>10–32767 seconds<br>If < 0;<br>Negate value, change to 1–32000 minutes |
| 9 | Message Retry Rate | 90–32767 Seconds |
| 10 | PVT Packet Transmission Rate | 0–32000 Seconds |
| 11 | Transmit queue size limit | 1–400 Points<br>0 = Most efficient<br>−1 = Disabled |
| 12 | Transmit queue idle limit | 1–255 minutes<br>0 = Idle limit disabled |
| 13 | PVT age limit | 1–255 days<br>0 = PVT age ignored |
| 14 | Number of PVT retries | 0–3 |
| 15 | PVT Retry time-out | 90–255 seconds |
| 16 | Server down re-check interval | 1–1440 minutes<br>0 = Re-check disabled |
| 17 | Server down NACK (not acknowledge) limit | 1–255<br>0 = Server down state disabled |
| 18 | Data session shutdown idle timeout | 0 = Disabled (keep session open indefinitely)<br>1–28800 seconds |
| 19 | Maximum data session limit | 0 = Disabled<br>1–1440 minutes |
| 20 | Modem power down timeout | 0 = disabled<br>1–7200 minutes |
| 21 | GPS power down timeout | 0 = disabled<br>1–7200 minutes |
| 22 | Power OFF timeout | 0–28800 minutes<br>0 = disabled |
| 23 | Battery low limit for low voltage | 0–100 percent of battery voltage |
| 24 | Battery low limit for critically low voltage | 0–100 percent of battery voltage |
| 25 | DHC (daily health check): Daily wake-up time (MSW - most significant word, e.g., 16 bits) | Seconds of day<br>1–86400<br>0 = Reset to Default value based on Device_ID<br>−1 = Disable Wake-up |
| 26 | DHC: Daily wake-up time (LSW - least significant word, e.g., 16 bits) | Seconds of day<br>1–86400<br>0 = Reset to Default value based on Device_ID<br>−1 = Disable Wake-up |
| 27 | DHC: idle time | 1–60 minutes |
| 28 | DHC: Health Info interval (Event code 15) | 1–30 days,<br>0 = disabled |
| 29 | DHC: Firmware Info interval (Event code 16) | 1–30 days,<br>0 = disabled |
| 30 | DHC: Data Usage Info interval (Event code 17) | 1–30 days,<br>0 = disabled |
| 31 | Accessory Port | 0 = Disabled<br>1 = User Defined<br>2 = Diagnostic<br>3 = GPS Receiver<br>4 = Barcode Scanner<br>5 = Camera<br>6 = Wireless Network Card<br>7 = Other |

Table 2 provides an exemplary list of event codes that can be specified in a profile. Each event code (also referred to as an invoke code) has an attribute that controls if and how the event gets transmitted to data processing station 102 (e.g., a central server). A Ping, such as in event codes 9 and 10, refers to data processing station 102 or mobile unit 108 requesting an immediate or rapid response from mobile unit 108 or data processing station 102, respectively, regarding a request for certain information. For example, data processing station 102 may request a current location for mobile unit 108 or other parameters associated with a profile or mobile unit 108 may request certain information be sent from data processing station 102.

TABLE 2

Exemplary Event Codes

| Event Code | Description |
|---|---|
| 0 | Power ON |
| 1 | Power-Up to Stop |
| 2 | Slow Moving to Stop |
| 3 | Stop to Move |
| 4 | Move to Stop |
| 5 | Start Point |
| 6 | Power down: Timer Expired |
| 7 | Power down: Low Battery |
| 8 | Update interval to Server |
| 9 | Ping (response to server request) |
| 10 | Ping (from mobile unit) |
| 11 | Low Battery |
| 12 | Modem sleep mode entered |
| 13 | Phone docked |
| 14 | Phone undocked |
| 15 | Diagnostic: Health Status |

TABLE 2-continued

Exemplary Event Codes

| Event Code | Description |
|---|---|
| 16 | Diagnostic: Firmware Status |
| 17 | Diagnostic: Data Usage Status |
| 18 | Timer 1 Expire |
| 19 | Timer 2 Expire |
| 20 | Timer 3 Expire |
| 21 | Illegal State to Power-Up |
| 22 | Memory Reset |
| 23 | GPS lost alarm |
| 24 | GPS found alarm |

Figure 2:
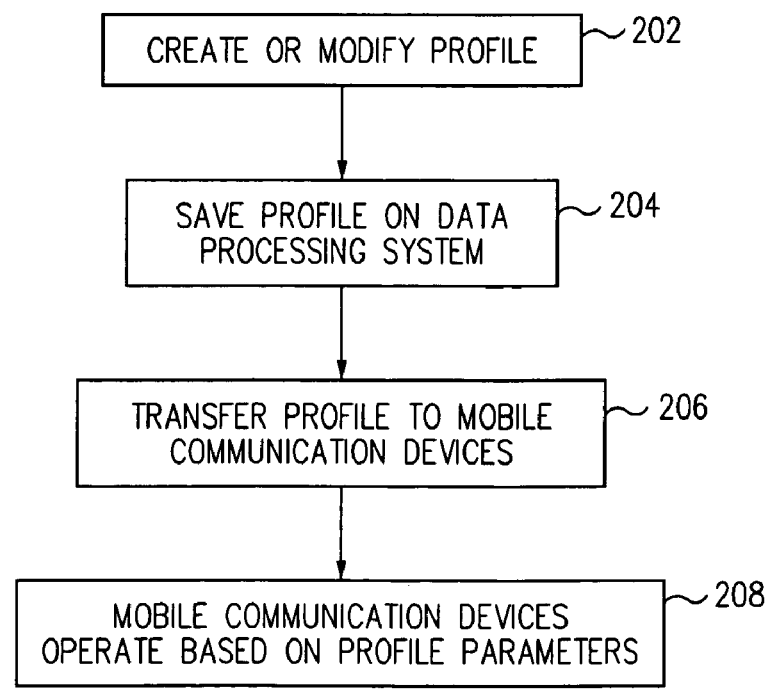
FIG. 2 illustrates an exemplary flowchart for managing profiles in accordance with an embodiment of the present invention.

FIG. 2 illustrates an exemplary flowchart for managing profiles in accordance with an embodiment of the present invention. Step 202 creates a profile or allows a profile to be modified. For example, computer 106 (FIG. 1) accesses data processing station 102 to perform step 202 or computer 106 solely is employed to perform step 202. Step 204 (FIG. 2) saves the profile at a processing location (e.g., a central server data processing system). For example, computer 106 saves the profile on data processing station 102. Step 206 transfers the profile to certain mobile communication devices. For example, data processing station 102 transmits via network 104 the recently created profile or edited profile to one or more of mobile units 108. In step 108, operational parameters of the mobile communication devices are at least partially controlled by parameters defined by the profile.

In accordance with an embodiment of the present invention, a system and method is disclosed for providing configuration data to mobile devices by creating or modifying the mobile device's profile on a server and pushing (i.e., communicating or transferring) the profile to each handset. The configuration data may include various operational parameters, such as for example the frequency of updating the server of the mobile device's location and possibly velocity, the frequency of requesting a position determination (e.g., a GPS position "fix"), and a number of "canned" messages or forms that allow the mobile device's user to report back to the server specific activities (e.g., "I just finished delivering to X", "I am now heading to Y for my next appointment", etc.).

As an example, each text message, including the "canned messages," may include a location and time stamp that provides information as to the location of the mobile device and the time when the message was sent. Table 3 illustrates an exemplary list of canned or preformed messages that could be selected and sent from mobile unit 108 to data processing station 102. As should be understood these are merely exemplary and virtually an unlimited number of preformed messages may be implemented by the techniques discussed herein.

TABLE 3

Exemplary Canned Messages

| Message Number | Message Text |
|---|---|
| 1 | OK? |
| 2 | Go to lunch |
| 3 | Goodbye |
| 4 | Help |
| 5 | What do I do next? |
| 6 | Vehicle disabled |
| 7 | Completed delivery |

TABLE 3-continued

Exemplary Canned Messages

| Message Number | Message Text |
|---|---|
| 8 | En route |
| 9 | Traffic Stop |
| 10 | Returning to office |

These messages may be provided by the mobile device, for example, by running an application written in Java (e.g., a Java micro edition application environment). The Java application may be multithreaded such that one or more of the threads may also be employed to control various operations and states of a mobile device (e.g., mobile unit 108).

As an example, the Java application may comprise eight threads. A first thread is for a GPS interface (or any other type of location determination interface), with the thread controlling the various GPS functions. A second thread is for a controller state machine that determines the state of mobile unit 108 (e.g., stopped, moving, slow moving, powering down or up, etc.). For example, U.S. patent application No. 10/377,563 entitled "Battery Consumption Optimization for Mobile Users" filed on the even date herewith and which is incorporated herein by reference in its entirety, describes an exemplary state machine that may be utilized for the second thread.

A third thread controls the storage of information (e.g., PVT information) and determines when to forward the information to the server (e.g., data processing station 102). The third thread, for example, functions as a queue state machine to determine when to transmit or retransmit the information. A fourth thread controls a communication interface, such as for example a user datagram protocol (UDP) transmitter/receiver to provide low level communications.

A fifth thread controls configuration aspects such as to monitor and manage the current profile and control and interpret profile parameters. A sixth thread performs diagnostics either via the mobile device or remotely to provide remote diagnosis (e.g., by the server). For example, the sixth thread may monitor the mobile device's health and send the current state, error, or exception conditions that exist if a problem occurs or if remotely prompted for this information.

A seventh thread controls initialization and provisioning. For example, the seventh thread may control the entering or verification of a personal identification, a serial number, and/or an authentication procedure, such as upon power-up, when application is first loaded into the mobile device, and/or when an authentication is required. An eighth thread provides a user interface, which may include the handling of messaging or forms or displaying information for the user or prompting for information.

As described above, the exemplary Java application, when installed in the mobile device, may be employed to control various operations and states of a mobile device. For example, the Java application may be downloaded by a user of mobile unit 108 from data processing station 102 or the Java application may be installed by some other method (e.g., via a data port on mobile unit 108 coupled to a computer or installed at time of manufacture). Alternatively, the functions performed by the Java application may be implemented in an application specific integrated circuit or incorporated as part of the main program of the mobile device.

Embodiments described above illustrate but do not limit the invention. It should also be understood that numerous modifications and variations are possible in accordance with the principles of the present invention. Accordingly, the scope of the invention is defined only by the following claims.

We claim:

1. A system comprising:
a network;
a data processor coupled to the network; and
at least one mobile communication device adapted to couple to the network to communicate with the data processor and adapted to receive location information, wherein the data processor provides a profile to the at least one mobile communication device, the profile containing parameters which control certain operations of the at least one mobile communication device.

2. The system of claim 1, wherein the data processor stores the profile, which can be accessed by a computer via the network to view or modify the profile.

3. The system of claim 2, wherein the data processor is adapted to update the at least one mobile communication device with the profile that has been modified.

4. The system of claim 3, wherein the computer accesses the profile by utilizing a web browser to view a website provided by the data processor.

5. The system of claim 4, wherein the computer comprises a personal computer, a cell phone, or a personal digital assistant.

6. The system of claim 1, wherein the mobile communication device couples to the network via a wireless network.

7. The system of claim 6, wherein the mobile communication device incorporates or is couplable to a global positioning system receiver to receive the location information.

8. The system of claim 6, wherein the mobile communication device utilizes a cellular network to receive the location information.

9. The system of claim 6, wherein the mobile communication device can view but not modify the profile provided by the data processor.

10. The system of claim 1, wherein the mobile communication device communicates with the data processor to provide location and reporting, dispatching, messaging, or management services.

11. The system of claim 1, wherein the parameters control the frequency of receiving the location information and determination of location and speed.

12. The system of claim 11, wherein the parameters further control the frequency of providing information from the mobile communication device to the data processor.

13. The system of claim 1, wherein the mobile communication device comprises a cell phone or a personal digital assistant.

14. The system of claim 1, wherein a Java application implemented in the mobile communication device provides an interface for the location information, a controller state machine, a communication interface, and a configuration function based on the profile.

15. The system of claim 14, wherein the Java application further provides a queue state machine, a diagnostics function, a provisioning function, and a user interface for the mobile communication device.

16. A method of managing mobile communication devices, the method comprising:
creating a profile that defines certain operational parameters of the mobile communication devices;
storing the profile on a data processing system; and
transferring the profile from the data processing system to the mobile communication devices, wherein the mobile communication devices operate based on the operational parameters of the profile.

17. The method of claim 16, further comprising viewing, by the mobile communication devices, of the profile transferred from the data processing system.

18. The method of claim 16, further comprising modifying the profile stored on the data processing system to create a new profile.

19. The method of claim 18, further comprising:
storing the new profile on the data processing system; and
transferring the new profile from the data processing system to the mobile communication devices, wherein the mobile communication devices operate based on the operational parameters of the new profile.

20. The method of claim 16, further comprising receiving location information by the mobile communication devices.

21. The method of claim 20, further comprising transferring the location information from the mobile communication devices to the data processing system.

22. A mobile communication device comprising:
a location determination system adapted to receive signals transmitted from satellites or a cellular network to determine a location of the mobile communication device; and
a communication system adapted to transmit and receive information through a wireless network, wherein the communication system is further adapted to communicate with a data processing station to receive a profile containing parameters which control certain functions of the mobile communication device.

23. The mobile communication device of claim 22, wherein the mobile communication device can view the parameters of the profile, the profile modified only by sending a new profile by the data processing station.

24. The mobile communication device of claim 22, wherein the mobile communication device communicates with the data processing station to provide location and reporting, dispatching, messaging, or management services.

25. The mobile communication device of claim 22, wherein the parameters control a frequency of determining the location of the mobile communication device and a frequency of providing the location to the data processing station.

26. The mobile communication device of claim 22, further comprising a Java application adapted to manage the profile and control the location determination system and the communication system.

* * * * *